United States Patent
López Martínez et al.

(10) Patent No.: US 7,568,833 B2
(45) Date of Patent: Aug. 4, 2009

(54) METHOD FOR THE CERTIFICATION OF HEATER BLANKETS BY MEANS OF INFRARED THERMOGRAPHY

(75) Inventors: Fernando López Martínez, Madrid (ES); Jose Manuel Yebras Rivera, Madrid (ES); Juan Melendez Sanchez, Madrid (ES); Antonio De Castro González, Madrid (ES); Jose Manuel Aranda Gallego, Madrid (ES)

(73) Assignee: EADS Construcciones Aeronauticas, S,A,, Madrid (ES)

( * ) Notice: Subject to any disclaimer, the term of this patent is extended or adjusted under 35 U.S.C. 154(b) by 693 days.

(21) Appl. No.: 11/071,056

(22) Filed: Mar. 3, 2005

(65) Prior Publication Data

US 2008/0068590 A1    Mar. 20, 2008

(30) Foreign Application Priority Data

Mar. 11, 2004    (ES)    ............................ 200400599

(51) Int. Cl.
*G01N 3/12*    (2006.01)
*G01N 17/00*    (2006.01)
*G01J 5/12*    (2006.01)
*G01J 5/00*    (2006.01)

(52) U.S. Cl. ...................... 374/121; 374/179; 374/4; 374/45; 374/57

(58) Field of Classification Search .............. 374/4, 374/5, 43–45, 57, 120–121, 129, 141, 143, 374/208, 126, 137, 1, 159, 163, 179, 111–115, 374/100, 109, 134; 219/341.1, 341.6, 341.8, 219/200, 212, 217, 243, 248, 251, 252, 264; 250/338.1

See application file for complete search history.

(56) References Cited

U.S. PATENT DOCUMENTS

| | | | | |
|---|---|---|---|---|
| 3,672,204 A * | 6/1972 | Green | .......................... | 374/43 |
| 5,552,576 A * | 9/1996 | Giamati | ....................... | 219/201 |
| 5,674,424 A * | 10/1997 | Iben et al. | .................... | 219/549 |
| 5,814,175 A * | 9/1998 | Rau et al. | .................... | 156/157 |
| 5,833,795 A * | 11/1998 | Smith et al. | ............... | 156/272.4 |
| 6,270,603 B1 * | 8/2001 | Westerman et al. | ........... | 156/94 |
| 6,487,866 B1 * | 12/2002 | Fesmire et al. | ............... | 62/51.1 |
| 6,742,926 B1 * | 6/2004 | Fesmire et al. | ................ | 374/45 |
| 6,824,306 B1 * | 11/2004 | Fesmire et al. | ................ | 374/43 |
| 7,083,327 B1 * | 8/2006 | Shepard | ....................... | 374/46 |
| 7,173,223 B2 * | 2/2007 | Kuo et al. | .................... | 219/529 |
| 7,390,992 B2 * | 6/2008 | Morgandi | .................... | 219/481 |
| 2003/0188821 A1 * | 10/2003 | Keller et al. | ................... | 156/94 |
| 2004/0217110 A1 * | 11/2004 | Gray | ........................... | 219/528 |
| 2005/0006526 A1 * | 1/2005 | McBroom | .................... | 244/119 |
| 2007/0177330 A1 * | 8/2007 | Ackerman et al. | .......... | 361/220 |

* cited by examiner

*Primary Examiner*—Gail Verbitsky
(74) *Attorney, Agent, or Firm*—Ladas and Parry LLP

(57) ABSTRACT

Method for the certification of heater blankets by means of infrared thermography, in which a heater blanket (1) to be certified is enclosed in a vacuum bag (3,4,5,5',8,9,10) arranged above a support (2) and thermally insulated therefrom, the vacuum is formed inside said bag and said heater blanket is connected until its temperature is stabilized at a predefined value, considerably higher than the ambient temperature, whereupon the best infrared image or images of said heater blanket (1) are recorded and stored by means of an infrared camera (14) situated opposite it, then interrupting the electric power supply to said heater blanket and processing the stored images so as to produce, finally, a certification report.

5 Claims, 3 Drawing Sheets

METHOD FOR THE CERTIFICATION OF HEATER BLANKETS BY MEANS OF INFRARED THERMOGRAPHY

FIELD OF THE INVENTION

The present invention relates to a method and a system for the meteorological certification of the means used, in particular, during repair of structures which incorporate composite materials manufactured with organic resins (epoxy resin, bis-maleimide resin, etc.) and fibres (carbon fibre, glass fibre, aramid fibre, etc.), which means will be referred to below as "heater blankets", using non-destructive analysis and evaluation techniques based on the processing of infrared images with spectral band selection.

During the treatment of parts or structure which incorporate said composite materials, for example for repair purposes, the organic resins are polymerized by means of the application of local heat; this heat is produced by means of the so-called heater blankets, it being indispensable to ensure a predefined uniformity of temperature before their use and during the whole working life of said heater blankets.

BACKGROUND ART

The inventors are not aware of the existence, in this field, of certification criteria established in connection with means of the kind mentioned used during the manufacture and repair of parts and structures produced with composite materials nor, obviously, of the availability of technology associated with the inspection means necessary for performing the thermal certification of said means.

It is only known of the existence of one standard for the certification of the said heater blankets used for repair of parts and structures of the abovementioned type, although the technology which is used for said certification is measurement by means of optical radiation pyrometry.

The known certification systems of the abovementioned type, based on measurements performed using optical radiation pyrometers, are based on the manual and pointwise recording of the instantaneous temperature value, indicated by a point having a predefined diameter (target size) at a focal distance which is also defined.

The measurements are performed manually, repeating them, normally up to ten times, at each one of the points which define a grid traced on the surface of the blanket to be certified. These values thus acquired are further processed, performing the appropriate calculations so as to obtain the statistical parameters (mean values, standard deviation, variance) as well as evaluation of the "measurement uncertainty factor" associated with the values obtained.

Once said values have been determined and compared with the tolerances defined in the certification requirements, a decision is taken as to the conformity or non-conformity of the heater blanket which is undergoing certification.

This pyrometric certification method according to the prior art is applied in accordance with the definitions of the internal standard for certification of heater blankets and basically consists of the following steps:

definition and manual tracing of a grid suited to the dimensions of the blanket to be certified, so as to thus define the minimum number of points to be evaluated;

preparation of the test configuration, application of a vacuum and maintaining the vacuum for the duration of the test;

heating of the blanket to the nominal temperature, typically in the region of 185° C. and maintaining this stabilized condition for a duration of between about 15 and about 35 minutes or for the time necessary to allow recording of the necessary data (temperature values);

pointwise measurement, by means of an optical radiation pyrometer calibrated within a temperature range which includes the nominal temperature value, of the temperatures on the surface of the heater blanket which, during use, is intended to come into contact with the surface of the composite material part to be treated;

repetition, a sufficient number of times, of the measurements taken at all the points (typically 10 repetitions per point), with the aim of obtaining a representative range of values which allows the appropriate statistical calculations;

cooling and interruption of the vacuum;

determining the values of the corrected readings, on the basis of the data in the pyrometer calibration certificate; and performing the statistical calculations necessary for determining whether, with the values obtained, it is possible to guarantee the uniformity tolerance required by the applicable standard.

This pyrometric method has the following problems and limitations:

a) very high measurement uncertainty: the value of this parameter is practically of the same order of magnitude as the temperature uniformity tolerance required of heater blankets. The reasons for these values lie in the poor precision of the method and the fact that it consists of a "manual" method which is affected by many influencing factors which result in a high variability of the readings obtained;

b) low reliability of the values obtained;

c) extreme slowness in the acquisition of the values, which results in a major increase in the cost of certification, so that it is not cost-effective from an industrial point of view; and d) impossibility of obtaining any type of graphical record: the temperature values are acquired manually by the technician performing the tests.

SUMMARY OF THE INVENTION

Therefore, the object of the invention is to provide a method and a system for solving the abovementioned problems by means of the processing of images acquired via an IR (infrared) camera.

The method in accordance with the invention includes the calibration, under the conditions in which the certification measurements are performed and with traceability to the 1990 International Temperature Scale (ITS-90) of the International System of Units, of the IR camera used as the main means for acquiring images.

Another object of the invention is the creation of the specific software for calibration, characterization of the camera, processing of the data acquired and creation of certification reports for said heater blankets.

The method and the system in accordance with the invention solve the abovementioned problems:

1) reducing considerably the uncertainty of the final measurement, while achieving:

a) calibration of the IR camera under real measurement conditions, incorporating corrections for the "influencing factors" which affect the measurements. Moreover, the measurements obtained are "traceable"—under the conditions in which they are acquired—to the 1990 ITS of the ISU; and b) elimination of the influence of the operators during acquisition of the temperature values;

2) increasing the reliability of the values acquired since, once the test has been configured, it is carried out in a practically automatic manner, without it being necessary to move the IR camera in order to acquire the values of the "n" cells of the previously defined grid;

3) reducing, very considerably, the time required to acquire and process the images, which is now about 30 minutes (including the emission of the corresponding certificate) instead of the 8 hours which are required with the pyrometric method of the prior art for a same blanket of the average type. In this way, it is possible to achieve certification of large quantities of heater blankets within a reasonably short period of time;

4) allowing the creation of graphical records since the values obtained are recorded electronically in data files which, subsequently, may be stored, for example on an optical medium so as to obtain graphical records on a paper medium.

Moreover the method according to the present invention and the system for implementing it offer considerable advantages compared to the pyrometric method of the prior art, such as:

the measurement is performed in a global and instantaneous manner with a very high spatial resolution;
the measurement is not affected by interference;
a time study of the measurements is possible;
the behaviour of the system can be observed on a large scale and with a high level of detail;
it is possible to use techniques for digital processing of the image;
it is possible to use colour palettes which allow rapid and simple interpretation of the results obtained; and
it uses a specific graphics software with the aim of allowing acquisition and processing of the certification method.

BRIEF DESCRIPTION OF THE DRAWINGS

Below the subject of this invention will be described with reference to the accompanying drawings in which in all the figures the same reference numbers have been used to indicate similar components and which show, by way of example, a currently preferred method of implementing the method in accordance with the present invention. In these drawings.

DETAILED DESCRIPTION OF THE PREFERRED EMBODIMENTS

Figure 1:
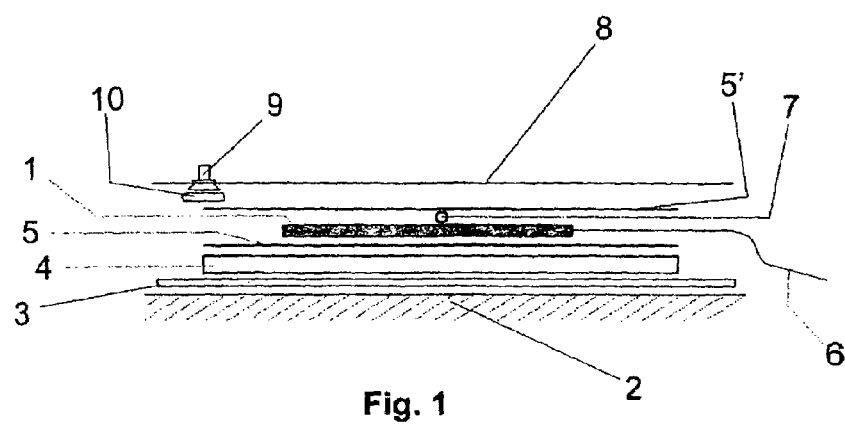
FIG. 1 is a schematic cross-sectional view of the arrangement of the component parts which are used for the preparation of a heater blanket for certification thereof by means of the method according to the invention, said parts having been shown separate from each other to facilitate understanding of the drawing.
Figure 2:
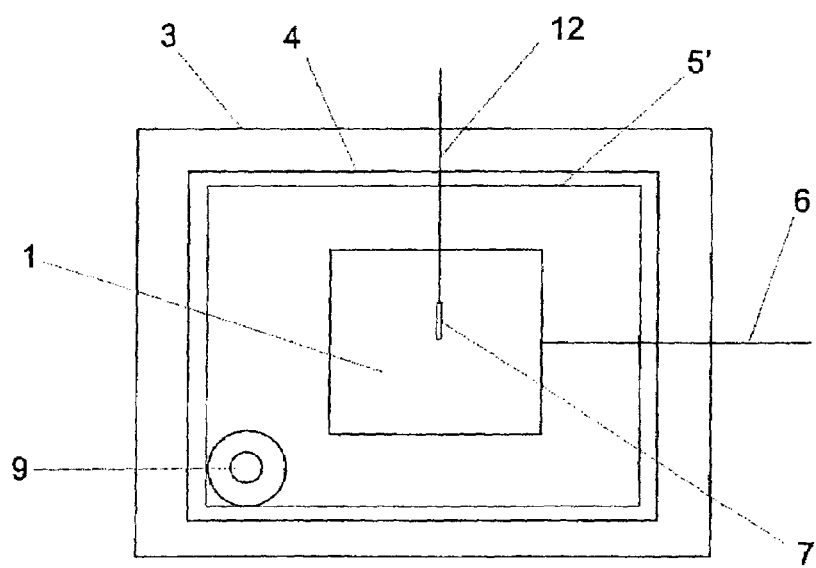
FIG. 2 is a diagrammatic plan view of the assembly shown in FIG. 1 in the assembled condition.

With reference now to the drawings and in particular to FIGS. 1 and 2 thereof, firstly preparation of the heater blanket 1, for undergoing the thermographic certification method according to the present invention will be described.

A laminated structure of polymerized carbon fibres is placed on top of a table or support 2 made of thermally insulating material, for example wood, and a woven glass-fibre based sheet 3 is arranged on top of it, said sheet in this case being shown with a square shape, but it being possible for it to have any other shape which is better suited to the type of heater blanket to be certified. An insulating layer 4 made, for example, of rubber is arranged directly on top of said sheet 3 and a thin sheet of glass fibre 5 is arranged thereon.

The blanket 1 with its working face upwards is arranged directly on this stacked assembly. The corresponding power supply leads 6 project from one side of said blanket 1.

Figure 3A:
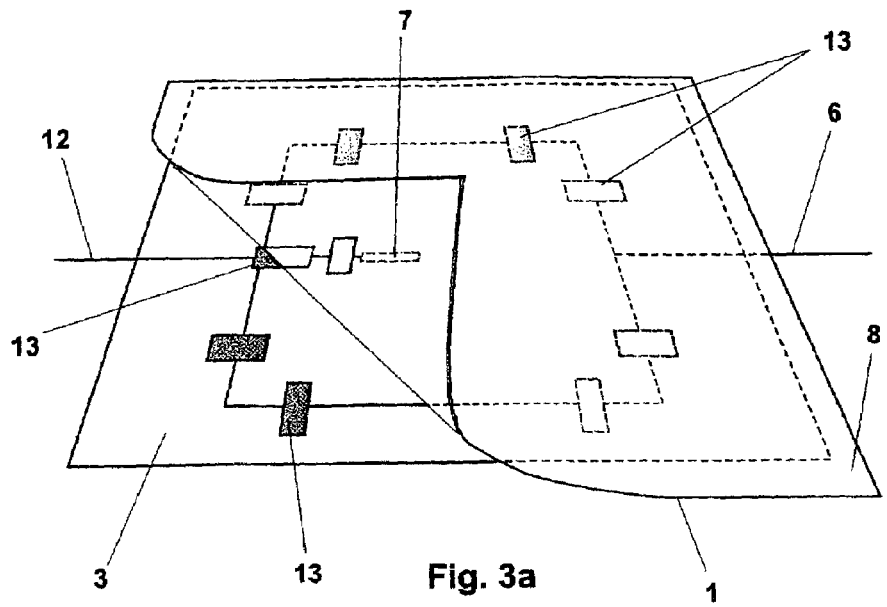
FIGS. 3a-3c are schematic perspective views of the arrangement of the component parts of the assembly shown in FIG. 1 during different stages of preparation of a heater blanket.
Figure 3B:
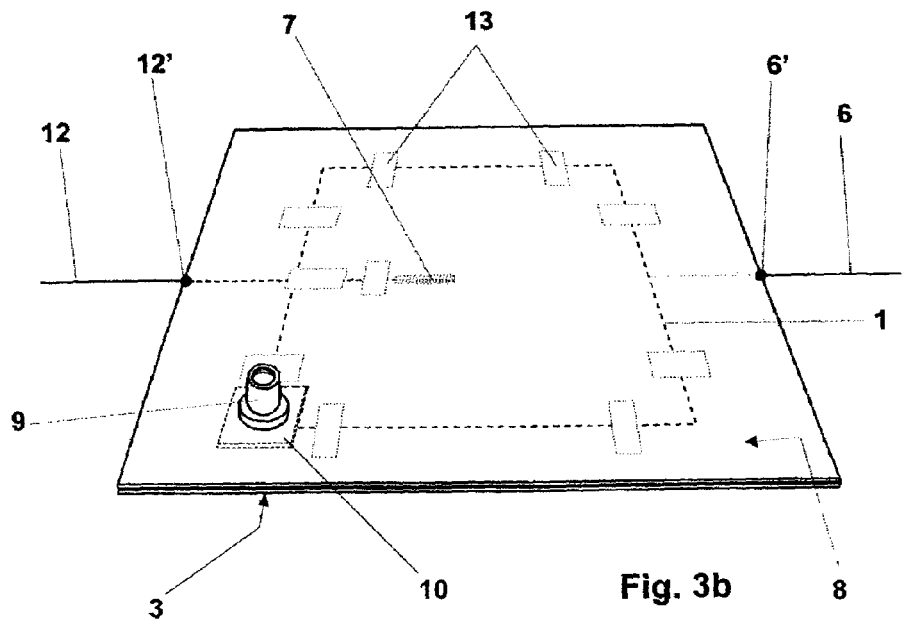
Figure 3C:
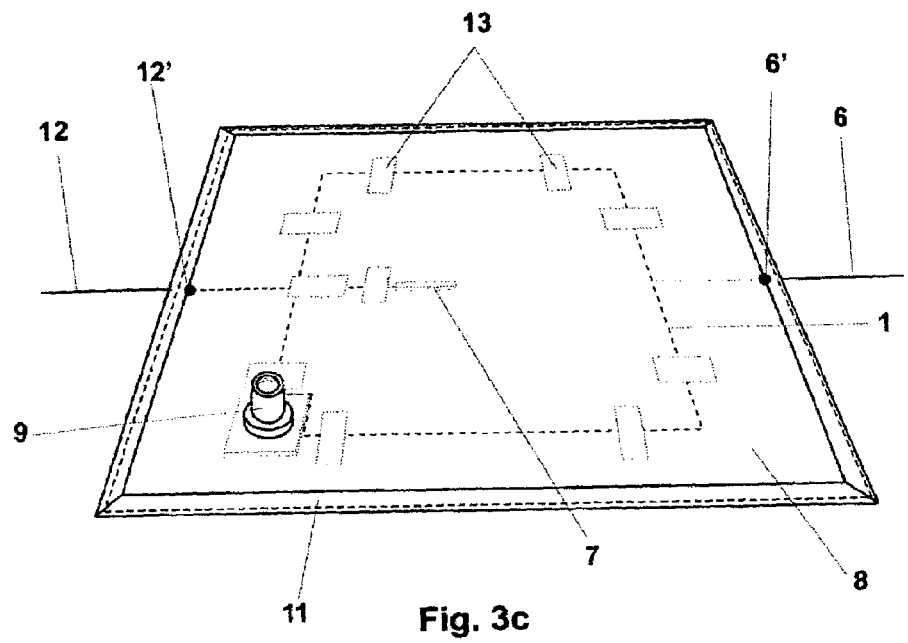

A reference thermocouple 7 is arranged on top of said blanket, both said blanket 1 being fixed along its edges and said thermocouple 7 being fixed on top of the blanket 1 by means, for example, of adhesive tape 13 capable of withstanding high temperatures (see FIGS. 3a-3c).

Lastly, an additional sheet 5' of glass fibre, similar to the abovementioned sheet 5, is arranged on top of the heater blanket 1 and the thermocouple 7 thus assembled, and finally the assembly is covered (see FIG. 3a) with a sheet of high-temperature plastic 8 for vacuum bags which is provided, in a suitable location thereon, with a vacuum valve 9 which, in the completed condition of the assembly, rests on a glass-fibre cushion 10 arranged between the base of said valve 9 and the underlying layer of material. The next operation which is performed in order to prepare said heater blanket 1 is to cut the excess rims of said plastic sheet 8 so that its edges remain flush with the edges of said bottom sheet 3 (see FIG. 3b).

It would be equally possible for said plastic sheet 8 to be equipped with an additional valve (not shown) for connecting a vacuum gauge.

In order to complete the configuration of the heater blanket 1 for certification thereof, it is required to define a vacuum bag by joining, in a sealing relationship, the periphery of the plastic sheet 8 to the carbon-fibre base plate 3. This is performed by means of the application, in a known manner, of a strip 11 of mastic along the whole edge of the assembly (see FIG. 3c), paying particular attention to the application of the mastic in the exit zone 6' of the power supply leads 6 for the heater blanket 1 and exit zone 12' of the lead 12 for the thermocouple 7 respectively, so that an absolutely hermetic closure is obtained (see FIG. 3c).

Figure 4:
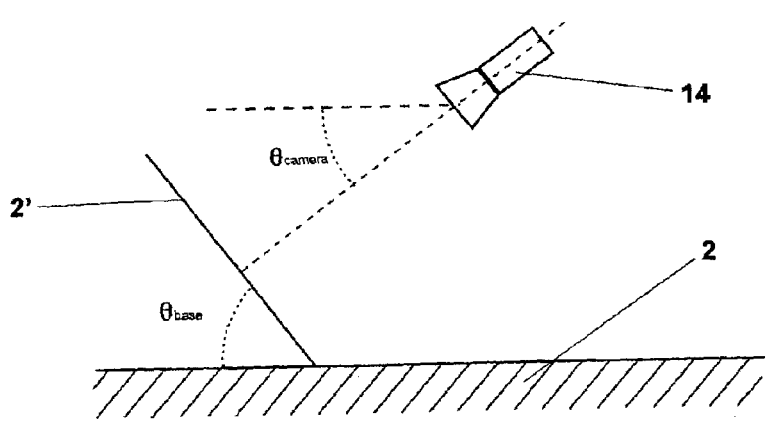
FIG. 4 is a diagram which shows the relative arrangement of the assembly according to FIG. 1 and the infrared camera used in the method according to the invention.

With reference now to FIG. 4, it shows in diagrammatic form, by way of example, a spatial arrangement of the support 2 for the heater blanket assembly 1 prepared for certification thereof and the IR camera 14 with which thermographic reading of said heater blanket will be performed.

The structure which houses the heater blanket 1 in its interior may be arranged in the horizontal position, on top of said thermally insulating support 2, although, alternatively, it is also possible to arrange it, 2', so that it forms with the horizontal a certain angle $\theta_{base}$, preferably less than 40°, with a view to making the measurement method more flexible.

In any case, the relative spatial positions of the IR camera 14 and the vacuum bag structure must be such that the heater blanket 1 remains centred and occupies most of the image. Obviously, in order to achieve this, there exists the possibility of adjusting the position of both elements, while always keeping the geometrical axis of the camera 14 preferably perpendicular to the plane of the heater blanket 1 with the aim of preventing distortion of the image.

In said FIG. 4 it can be seen that $\theta_{base}$ is the angle which the heater blanket 1 arranged, at 2', on top of said insulating base will form with the horizontal and $\theta_{camera}$ is the angle of inclination of the camera 14. In order to obtain an image without distortion it is necessary for the lateral angle of observation to be 0° and for $\partial_{base} + \theta_{camera} = 90°$.

At this point, with the heater blanket arranged in any one of the two positions (horizontal or inclined), the measurement cycle which is to be used for certification is started, which cycle typically comprises:

a) a first heating step, which we shall call stage 1, with a duration, for example, of about 40 minutes;

b) a second temperature stabilization step, called stage 2, the maximum duration of which will be about 120 minutes, typically about 20 to about 30 minutes, and c) a third and last cooling step, called stage 3, with a duration of about 30 minutes. The nominal temperature during this cycle is about 175° C., other nominal temperatures being possible depending on the polymerization temperature of the resin which is to be cured with the heater blanket.

Firstly a vacuum source (not shown) is connected to the vacuum valve 9, by means of which the vacuum inside the aforementioned assembly which contains the blanket to be certified is obtained. Then, the electric power supply is connected to the heater blanket 1 and the temperature on its surface is allowed to reach a temperature considerably higher than the ambient temperature, waiting for example about 30 minutes. In these conditions, the heater blanket will offer a clear IR image which will facilitate the positioning and focussing of the IR camera 14.

The IR camera 14 is mounted opposite the heater blanket 1 already prepared, at a distance such that it is possible to achieve an optimum shot of the whole surface thereof (between 1.5 and 3 metres). Said camera 14 has, incorporated in its lens, a narrow optical filter (length of the central wave equal to about 4 $\mu$m). For its part, the analog video output of the camera 14 is connected to a suitable display monitor (not shown) so as to allow realtime observation of the situation in IR, and the digital video output thereof is connected to an image acquisition card of the computer for controlling, acquiring and processing said images (not shown). Finally, the IR camera 14 is connected to a specific power supply source.

Control of the camera 14 may be performed via an external control panel or by means of a computer, via the appropriate connections to each of them.

With the equipment thus arranged, it is possible to modify the lateral angle and the angle of inclination of the IR camera 14 so as to obtain an image in which the heater blanket 1 is centred and occupies most of the image. Care must be taken, as mentioned before, to ensure that observation occurs in a direction substantially perpendicular to the plane of the blanket.

The last adjustments to the focus, position and inclination of the camera 14 in order to obtain a suitable image of the heater blanket 1 are performed when the stage 2 of the measurement cycle being carried out is reached, namely when the start of the temperature stabilization stage is reached.

On the other hand, the acquisition system is prepared by suitably configuring the image acquisition card incorporated in the control computer and, lastly, running of the specific software THERMOS 2.0 for certification of heater blankets is started, this software carrying out the following operative steps:

1) configuration step: it checks that the configuration established is the right one for performing certification and the appropriate changes are made. Amongst other parameters, it is required to define the number of images which are to be taken during the acquisition stage, the time interval between them, whether the acquisition is performed automatically or manually and, also, a threshold value for the maximum and minimum temperature difference is defined;

2) acquisition step: the instructions given by the certification program are followed, providing an identifier for the heater blanket with the aim of generating a specific area for storing the data relating to the certification in progress. Moreover, it will be required to define a rectangle indicating the limits of the heater blanket on the image provided by the IR camera 14, specifying the dimensions of said blanket. Once image recording has been completed, the computer will store the sequence of recorded images and generate and store a mean image of said sequence;

3) cooling step or aforementioned stage 3; and 4) processing step.

Once this measuring cycle has been completed, the measuring equipment, including the IR camera 14, is switched off.

The following step of the method in accordance with the invention is the generation of the certification report.

For this purpose, and again working with the software designed for this purpose, firstly a thermometric analysis grid is drawn on the mean image generated during the abovementioned acquisition step. Said drawing operation comprises three steps: selecting the initial point of the grid; selecting the size of the basic cell of the grid, and selecting the number of horizontal and vertical cells.

On the basis of this selection, the software will determine the limit values of the cells (maximum and minimum temperatures). If the difference in temperature between these limit cells is less than the threshold value previously defined during the configuration step (MDTR=Maximum difference in temperature reject), the software will recommend acceptance of the heater blanket. Otherwise, the program will pass to a demarcation step, consisting in defining the cells of the grid which will remain within a temperature range which is symmetrical or asymmetrical about the mean temperature of the heater blanket (mean temperature of the entire analysis grid).

In any case, the software finally generates a certification report which incorporates the processed images in a standard image format.

The last step of the method of the present invention is the so-called stage 3 or cooling step, at the end of which the vacuum source of the valve 9 is disconnected, the power supply 6 of the heater blanket 1 and the reference thermocouple 7 are disconnected and, finally, the IR camera 14 is disconnected, whereby the method for certification of the heater blanket is considered completed.

Of course, before starting a certification process or, where required, it is necessary to perform emissivity calibration of the equipment used (IR camera 14). For this purpose, there exist two alternative calibration methods: using a calibration blanket or using a grey calibration body.

In the first method the calibration blanket is prepared in a manner similar to the preparation carried out to perform the blanket certification process, namely, the following are provided: a base, a rubber cushion as insulation, a glass-fibre layer, a heater blanket with dimensions of approximately 30×30 cm, a reference thermocouple close to one of the edges of the blanket and without it being located in the centre thereof. These elements are fixed in position using high-temperature adhesive tape.

A flat sheet of copper or anodized aluminium (for the purpose of obtaining a high emissivity) with a thickness of between 1 and 2 mm and dimensions of approximately (7×7) cm is then placed onto the centre of the heater blanket. Said sheet is also fixed by means of high-temperature adhesive tape and its function is to correct the lack of homogeneity in temperature which the heater blanket has owing to its internal structure of rolled-up filaments.

The configuration of this calibration heater blanket is reinforced with another glass-fibre sheet and a plastic vacuum sheet, as in the preferred embodiment described above. Likewise, the structure is closed by gluing the plastic sheet arranged as a covering sheet to the edges of said base by means of the corresponding mastic.

This calibration blanket vacuum assembly is arranged horizontally, together with a thermally insulating structure which raises it up about 10 cm above the selected support.

The reference thermocouple is connected to the measuring equipment, a vacuum is applied to the calibration blanket and the programmed measurement cycle which is to be used for emissivity calibration is started.

In the grey body calibration method, it is required to have a grey body whose temperature may be adjusted (between a minimum range of 25°-30° C. and 200° C.). For preparation of this grey body with a view to emissivity calibration of the IR camera, the following procedure is used:

if the calibration body does not possess a very precise temperature adjustment, a thermocouple is arranged on top of the radiating surface with greatest emissivity, towards the middle of the space lying between the centre of the surface and its bottom edge; firm contact of the thermocouple with the radiating surface is ensured by means of high-temperature adhesive tape;

the negative pole of said thermocouple is connected to the negative pole of another thermocouple of the same type, submerging the latter in an ice bath (0° C.) with the aim of performing correction of the cold connection. The positive poles of both thermocouples are connected to a measuring device for measuring temperatures with the type of thermocouple used;

by means of an "electric zero" for correcting the cold connection with the type of thermocouple used, the negative pole of the measurement thermocouple is brought to the corresponding terminal of the "electric zero", and the positive pole of the measurement thermocouple and the positive pole of the electric zero are connected to a measuring device prepared for measuring temperatures with the type of thermocouple used;

a glass-fibre layer is arranged on top of the same radiating surface, ensuring that, as far as possible, there are no air pockets;

this glass-fibre layer is fixed with high-temperature adhesive tape and, finally;

a plastic vacuum sheet is arranged on top of the glass-fibre layer, making sure, in this case also, that there are no air pockets;

this plastic vacuum sheet is fixed by means of high-temperature adhesive tape and finally;

the calibration body is arranged on a working base at a suitable height so that the IR camera is able to capture and focus on it, said calibration grey body is switched on and its temperature is fixed at a relatively low nominal value (50°-60°) C.

As to preparation of the IR camera for carrying out the calibration readings, it is similar to the preparation performed in the above-described preferred embodiment of the method for certification of the heater blanket. The same applies to preparation of the acquisition system.

With regard to the calibration method, this will be performed for various temperatures ($T_1, T_2, \ldots, T_n$).

In the case where the calibration method is performed by means of a calibration heater blanket, the steps followed are the same as those for performing certification of one of these objects, except that when the method is in stage 1 of the measurement cycle (heating step) and the blanket reaches the first measurement temperature, $T_1$, the cycle stops for a certain time interval during which the nominal temperature of the blanket will be $T_1$, so that the equipment will be adjusted in order to keep the blanket at said temperature.

On the other hand, if the calibration is performed by means of a grey calibration body, the nominal temperature of the grey body is adjusted to the first measurement temperature ($T_1$) and the calibration body is allowed to reach said value and remain stabilized there. If the temperature adjustment precision of the calibration body is not reliable, measurement of its temperature will be performed by means of said measurement thermocouple.

As from this moment, both in the case where a heater blanket and in the case where a grey body are used for calibration, the steps to be followed are as follows:

record the temperature indicated by the reference thermocouple (whatever the calibration body used);

arrange an optical pyrometer, forming an angle of 90° with respect to the calibration body, focussing on the centre of the anodized sheet and at a distance of about 50 mm therefrom;

adjust the emissivity parameter of the optical pyrometer until the temperature reading which is obtained with the latter is equal to the temperature measured with the reference thermocouple;

record the emissivity value obtained: equivalent emissivity of the optical pyrometer at the reference temperature $T_1$;

remove the optical pyrometer from the calibration body;

acquire an IR image of the calibration body using the certification software;

in the generic processing module of said software, "measurements on image", the gain and displacement parameters suitable for calibration of the IR camera equipped with a narrow optical filter are set, the temperature is measured in the centre of the anodized sheet and the emissivity parameter is adjusted until the temperature measurement obtained is equal to the temperature measured with the reference thermocouple and with the optical pyrometer;

record the emissivity value obtained: equivalent emissivity of the IR camera at the reference temperature $T_1$;

heat the calibration object, i.e., the blanket or the grey body to the second measurement temperature, T2, and stabilize it there, repeating the previous steps performed for the temperature $T_1$ with the aim of obtaining the following equivalent emissivity parameters of the optical pyrometer and the IR camera at the reference temperature $T_2$;

repeat these operations for the remaining reference temperatures $T_3, \ldots, T_n$;

create a table of 5 columns by n rows in which:

column 1 contains the measurement temperatures of the calibration body;

column 2 contains the equivalent emissivity values of the optical pyrometer for the corresponding temperatures of the column 1;

column 3 contains the temperatures measured with the optical pyrometer and with the corresponding emissivity values of column 2;

column 4 contains the equivalent emissivity values of the IR camera for the corresponding temperatures of the column 1; and column 5 contains the temperatures measured with the JR camera and with the corresponding emissivity values of the column 4.

Then, depending on the emissivity values obtained, various temperature ranges may be considered and, for each of them, the mean emissivity is determined. With this mean emissivity value and with the values of the gain and displacement parameters appropriate for calibration of the IR camera equipped with the narrow optical filter, the temperatures on the images associated with the temperature range considered (let us assume m images) are measured. A table of m values is then formed and by means of this table the error existing between the pyrometry measurement and the thermography measurement obtained is evaluated.

On the basis of said error values it is possible to obtain the mean error which, together with the remaining emissivity, gain and displacement values, said error table, the table of emissivity and temperature results, environmental conditions, type of calibration body, measuring instruments, etc., form the desired emissivity calibration report.

Although the method according to this invention has been illustrated and described in connection with a preferred embodiment thereof, it is understood that the invention is not limited to said specific description and it is possible to make various changes and modifications thereto, without thereby departing from the scope of the invention as defined in the accompanying claims.

The invention claimed is:

1. Method for certification for a uniformity of temperature tolerance of a heater blanket by infrared thermography, comprising the steps of:
   a) preparing a heater blanket to be certified, confining said heater blanket within a vacuum bag arranged above a support made of thermally insulating material, said heater blanket being arranged substantially horizontally with respect to said support;
   b) arranging a reference thermocouple in direct contact with said heater blanket;
   c) generating a vacuum inside said vacuum bag;
   d) arranging an IR camera opposite said heater blanket so that a geometrical axis of the lens of said camera forms an angle of, substantially, 90 degrees with a plane of said heater blanket;
   e) connecting a power supply to said heater blanket for a first heating time period until a temperature measured by said thermocouple on the surface of said heater blanket is higher than ambient temperature;
   f) keeping said power supply connected during a second time period for stabilization of the temperature;
   g) recording an IR image or a sequence of IR images of said heater blanket during operation by means of said IR camera;
   h) storing the image or the sequence of images recorded;
   i) interrupting the power supply to said heater blanket and allowing the heater blanket to cool; and
   j) processing the stored image or sequence of images to determine the uniformity of temperature tolerance of the heater blanket.

2. Method according to claim 1, wherein said IR camera has a narrow optical filter coupled to its lens.

3. Method according to claim 1, wherein said substantially horizontal support is a thermally insulating support.

4. Method according to claim 1, wherein said heater blanket support forms a maximum angle ($\Theta_{base}$) of 40° with the horizontal.

5. Method according to claim 1, wherein said step j) comprises the steps of:
   i) generating and storing a mean image of said sequence of images acquired during the operation h);
   ii) drawing a thermometric analysis grid on top of said mean image thus generated, said grid being divided into cell;
   iii) determining maximum temperature limit values and minimum temperature limit values of the cells of said grid so as to obtain a temperature difference between said maximum and minimum temperature limit values of the cells; and
   iv) comparing the temperature difference thus obtained with a previously defined threshold value, so as to accept or reject said heater blanket depending on whether said temperature difference is lower than or higher than said threshold value, respectively.

* * * * *